US007539395B2

(12) United States Patent
Fakhruddin

(10) Patent No.: US 7,539,395 B2
(45) Date of Patent: May 26, 2009

(54) AUDIO/VIDEO RECORDING APPARATUS AND METHOD OF MULTIPLEXING AUDIO/VIDEO DATA

(75) Inventor: Muzaffar Fakhruddin, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1052 days.

(21) Appl. No.: 10/197,035

(22) Filed: Jul. 16, 2002

(65) Prior Publication Data

US 2003/0016946 A1    Jan. 23, 2003

(30) Foreign Application Priority Data

Jul. 18, 2001    (GB)    .................... 0117540.5

(51) Int. Cl.
*H04N 7/00* (2006.01)
*H04N 7/087* (2006.01)

(52) U.S. Cl. .......................... 386/95; 386/69
(58) Field of Classification Search ............... 386/1, 386/98; 370/473, 474, 428
See application file for complete search history.

(56) References Cited

U.S. PATENT DOCUMENTS

| | | | | |
|---|---|---|---|---|
| 5,170,263 A * | 12/1992 | Hisatake et al. | ............ | 358/3.29 |
| 5,801,782 A * | 9/1998 | Patterson | .................... | 348/473 |
| 6,161,154 A * | 12/2000 | Schultz et al. | ................ | 710/56 |
| 6,233,389 B1 * | 5/2001 | Barton et al. | .................. | 386/46 |
| 6,236,694 B1 | 5/2001 | Blatter et al. | | |
| 6,298,071 B1 * | 10/2001 | Taylor et al. | ................ | 370/486 |
| 6,801,536 B1 * | 10/2004 | Foster et al. | ................ | 370/412 |
| 6,975,324 B1 * | 12/2005 | Valmiki et al. | .............. | 345/555 |
| 7,076,150 B2 * | 7/2006 | Morinaga et al. | ............. | 386/65 |
| 2002/0114388 A1 * | 8/2002 | Ueda et al. | ............. | 375/240.01 |

FOREIGN PATENT DOCUMENTS

| | | |
|---|---|---|
| EP | 1 098 523 A1 | 5/2001 |
| JP | 03-204023 | 9/1991 |
| JP | 9-081166 | 3/1997 |
| JP | 10-042244 | 2/1998 |
| JP | 10-199108 | 7/1998 |
| JP | 11-146326 | 5/1999 |
| JP | 11-338644 | 12/1999 |
| WO | 01/26385 A1 | 4/2001 |

* cited by examiner

*Primary Examiner*—Thai Tran
*Assistant Examiner*—Hung Q Dang
(74) *Attorney, Agent, or Firm*—Oblon, Spivak, McClelland, Maier & Neustadt, P.C.

(57) ABSTRACT

An audio/video recording apparatus and a method of multiplexing audio/video data of a first input memory with supplementary data of a second input memory wherein a DMA processor is provided with a link list for the audio/video data and the supplementary data, an output memory is provided with instructions to receive a data amount equal to the combination of audio/video data and supplementary data and the DMA processor is instructed to carry out a DMA process to the output memory on the basis of the link list.

11 Claims, 6 Drawing Sheets

AUDIO/VIDEO RECORDING APPARATUS AND METHOD OF MULTIPLEXING AUDIO/VIDEO DATA

BACKGROUND OF THE INVENTION

1. Field of the Invention

The present invention relates to an audio/video recording apparatus and a method of multiplexing audio/video data, in particular, when recording audio/video data in a memory, such as a recording medium, together with supplementary data.

2. Description of the Related Art

In order to record supplementary data along with audio/video streaming data on a digital storage medium, it is known to multiplex the audio/video data with the additional information in a memory before then transferring the multiplexed data to the recording medium as a whole. This is illustrated schematically in FIG. 1 of the accompanying drawings. A single DMA process is used to transfer the multiplexed data from the memory to the recording medium so as to provide it as a whole to the recording medium. However, a number of individual DMA processes are required to transfer the sections of audio/video data and supplementary data to the intermediary memory.

Alternatively, the supplementary data can be recorded on the recording medium at a later time and at a different place to the main audio/video data. This is illustrated schematically in FIG. 2 of the accompanying drawings.

Both methods require system resources. In the case of multiplexing the data to an intermediary memory first, the system requires the system resources to do the multiplexing and the additional memory in which the multiplexed data is stored before transfer to the recording medium. On the other hand, when the supplementary data is stored at a different place on the storage medium to the audio/video data, the bandwidth to the storage medium is reduced, especially if the storage medium has a large seek time, for instance to move a mechanical read/write head to a new location.

This is particularly applicable to recording devices which record an input stream of audio/video data, together with supplementary data received with the audio/video data. A log of the supplementary data may be kept as the input audio/video data is received. It is possible to record the log after all of the audio/video data has been recorded on the recording medium. However, this makes reproduction undesirable, since, to reproduce the audio/video data together with the supplementary data, the reproduction device has to access different positions of the recording medium which are spaced widely apart. It is desirable, therefore, to interlace or multiplex the information from the log in with the audio/video data stored on the recording medium. As explained above, this was previously achieved by multiplexing the data in a separate memory before transfer to the recording medium.

OBJECTS OF THE INVENTION

It is an object of the invention to allow the problems discussed above to be overcome and to allow multiplexing of two or more data streams/sources.

SUMMARY OF THE INVENTION

According to the present invention, there is provided a method of multiplexing audio/video data of a first input memory with supplementary data of a second input memory using a DMA processor. The method includes providing the DMA processor with a link list for the audio/video data and the supplementary data, providing an output memory with instructions to receive a data amount equal to the combination of audio/video data and supplementary data and instructing the DMA processor to carry out a DMA process to the output memory on the basis of the link list.

According to the present invention, there is provided an audio/video recording apparatus including a first input memory for storing audio/video data, a second input memory for storing supplementary data, an output memory, a DMA processor connected between the first and second input memories and the output memory and a controller for initiating a DMA process by instructing the output memory to receive a data amount equal to a sum of the audio/video data and the supplementary data and by providing the DMA processor with a link list so as to transfer the audio/video data and supplementary data to the output memory according to the link list.

In this way, the audio/video data and the supplementary data may be transferred and multiplexed in one step to an output memory, such as a recording medium.

The invention allows the freeing of system resources from the task of multiplexing two or more data streams. The task of multiplexing is done automatically by setting up an appropriate chain of DMA transfers wherein each list in the chain causes DMA transfer of data from a different point in the apparatus source memory (first and second input memories) to the recording output memory or medium.

Since normal operation would already require a DMA transfer to the output or recording memory, there is no additional system resources needed for the operation.

In practice, the input memories may be included in the same physical memory, such as a chip, for instance as separate areas.

Preferably, the supplementary data includes index data for the audio/video data.

The index data is received with the audio/video data, for instance in MPEG packets, and relates directly to the audio/video data with which it is carried. Thus, it is important that the index data be recorded in a manner such that it can be retrieved together with the related audio/video data.

Hence, multiplexing this data in the manner of the present invention for recording on a recording medium is highly advantageous.

Preferably, the apparatus further includes an input for an MPEG stream containing the audio/video data and index data and includes means for parsing the MPEG stream and for storing the audio/video data in the first memory and the supplementary data in the second memory.

In this way, the apparatus can be used to record an input MPEG stream.

Preferably, the apparatus further includes at least one interrupt for causing the controller to initiate the DMA process when either of the first and second input memories contain a respective predetermined amount of data.

In this way, the apparatus receives a stream of input data on a continuous basis, but, when either of the first and second memories contains a predetermined amount of data, for instance is full, the DMA process transfers the audio/video data and supplementary data to the output memory, for instance the recording medium.

In this way, the audio/video data and supplementary data may be recorded in alternate interlaced sections of the recording medium so as to record a continuous input stream.

Preferably, the supplementary data includes meta data for the audio/video data.

The meta data may be any data relating generally to the content of the audio/video data, for instance sub titles, supplementary information about the content of the audio/video data, supplementary audio data, etc.

Preferably, the apparatus further includes a third input memory for storing application data for applications related to the audio/video data wherein the controller initiates the DMA process by instructing the output memory to receive a data amount equal to a sum of the audio/video data, the supplementary data and at least a portion of the application data and by providing the DMA processor with a link list so as to transfer the audio/video data, supplementary data and the at least a portion of the application data to the output memory according to the link list.

The application data may be any data for use in relation to the audio/video data. It may be received from the same data path as the audio/video data, but at a different time or on a different channel. Alternatively, the application data might be received from a different data path, such as via the internet.

By multiplexing this application data with the audio/video data for recording on the recording medium, the application data is available to a user immediately when reproducing the audio/video data. It this way, whatever application is provided by the application data will be available to the user at the time of reproduction of the audio/video data.

Preferably, each time the controller initiates the DMA process, the controller instructs the output memory and provides a link list in respect of a different portion of the application data such that the application data is multiplexed with consecutive amounts of audio/video and supplementary data from the first and second memories.

In this way, the application data can be spread in an interlaced fashion with consecutive blocks of audio/video and supplementary data. This reduces the extent to which the insertion of the application data affects seek times for the audio/video data.

The output memory may have large seek times, but fast continuous access times.

In this respect, the output memory may be a hard disk drive.

The present invention is particularly advantageous in this respect, since it allows related data to be provided together on a recording medium and avoids the need for the output memory to seek data.

The present invention is particularly applicable when embodied in an integrated television device, a set top box for a television or a stand alone video recorder.

DETAILED DESCRIPTION OF THE PREFERRED EMBODIMENTS

The invention will be more clearly understood from the following description, given by way of example only, with reference to the accompanying drawings.

In most devices that record audio/video streaming data on to a digital storage medium, the recording device also adds some sort of index or meta data which is related to the audio/video data being recorded. Hence, this additional information needs also to be stored on the storage medium. Additionally, there are times when another stream needs to be multiplexed into the main audio/video stream to create a new multiplexed stream.

Figure 3:
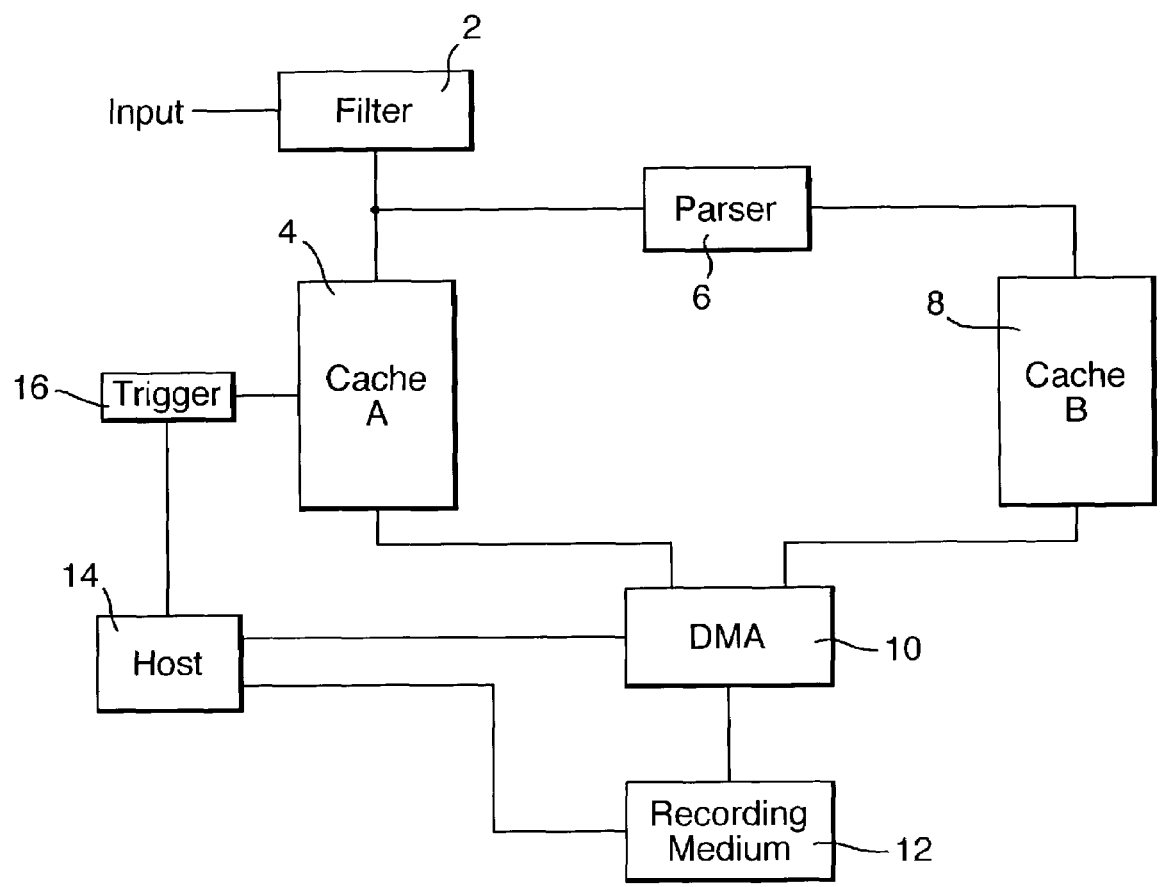
FIG. 3 illustrates an embodiment of the present invention.

In a first embodiment of the present invention, as illustrated in FIG. 3, an input data stream is received by a filter 2 to separate from the data stream the desired channel. Thus, typically, the input data stream will be an MPEG data stream containing data packets for different channels. Filter 2 acquires the appropriate data packets and provides this data to the further parts of the apparatus.

The audio/video data is stored consecutively in a first memory 4. This may be a cache memory and is labelled cache A.

Along with the audio/video data, digital audio/video data streams include supplementary data, such as index data. In particular, the index data provides indexing information regarding the audio/video data, for instance time and frame codes, etc.

As illustrated, a parser 6 processes the data stream output from the filter 2 so as to extract any supplementary data on an ongoing basis. This supplementary data is stored in a second memory 8. This may be a cache memory and is labelled cache B. This process avoids the need of subsequently analysing the data stream in order to determine the supplementary data.

The apparatus then includes a DMA processor 10 which is controlled by a host processor 14 so as to transfer data to an output memory 12, such as the recording medium illustrated in FIG. 3.

Figure 1:
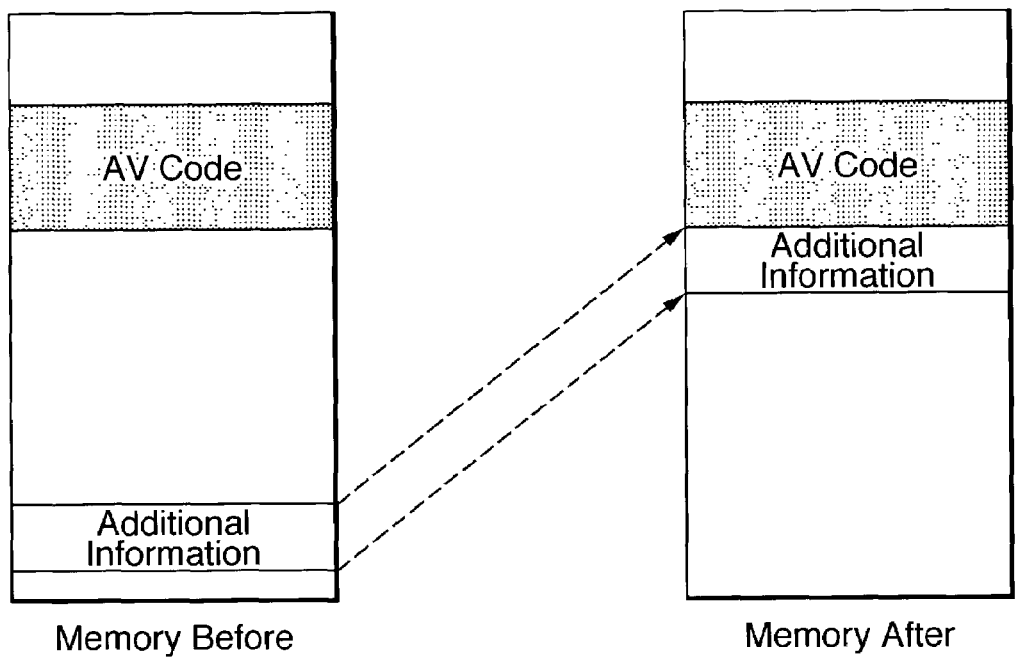
FIG. 1 illustrates schematically a process of multiplexing data in a memory.
Figure 2:
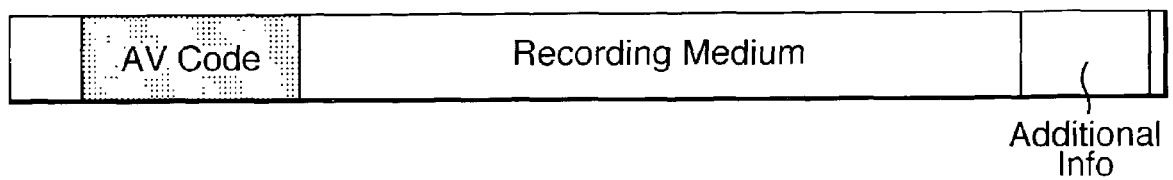
FIG. 2 illustrates schematically recording supplementary data separately to audio/video data on a recording medium.

According to previous techniques as discussed above, the apparatus could store the entire audio/video sequence required by the user in memory 4 and store all of the related index or supplementary data in cache 8. As illustrated by FIG. 2, a DMA process could be used to transfer the entire audio/video stream to a recording medium and, once this is completed, a further DMA process could be used to transfer the entire supplementary data to a further portion of the recording medium. Alternatively, in order to interlace various portions of the audio/video data stream and the supplementary data, multiple DMA processes could transfer alternately portions, as illustrated by FIG. 1, from the audio/video data and the supplementary data to a third memory and then use a single DMA process to transfer the data from that memory to the recording medium.

Figure 5:
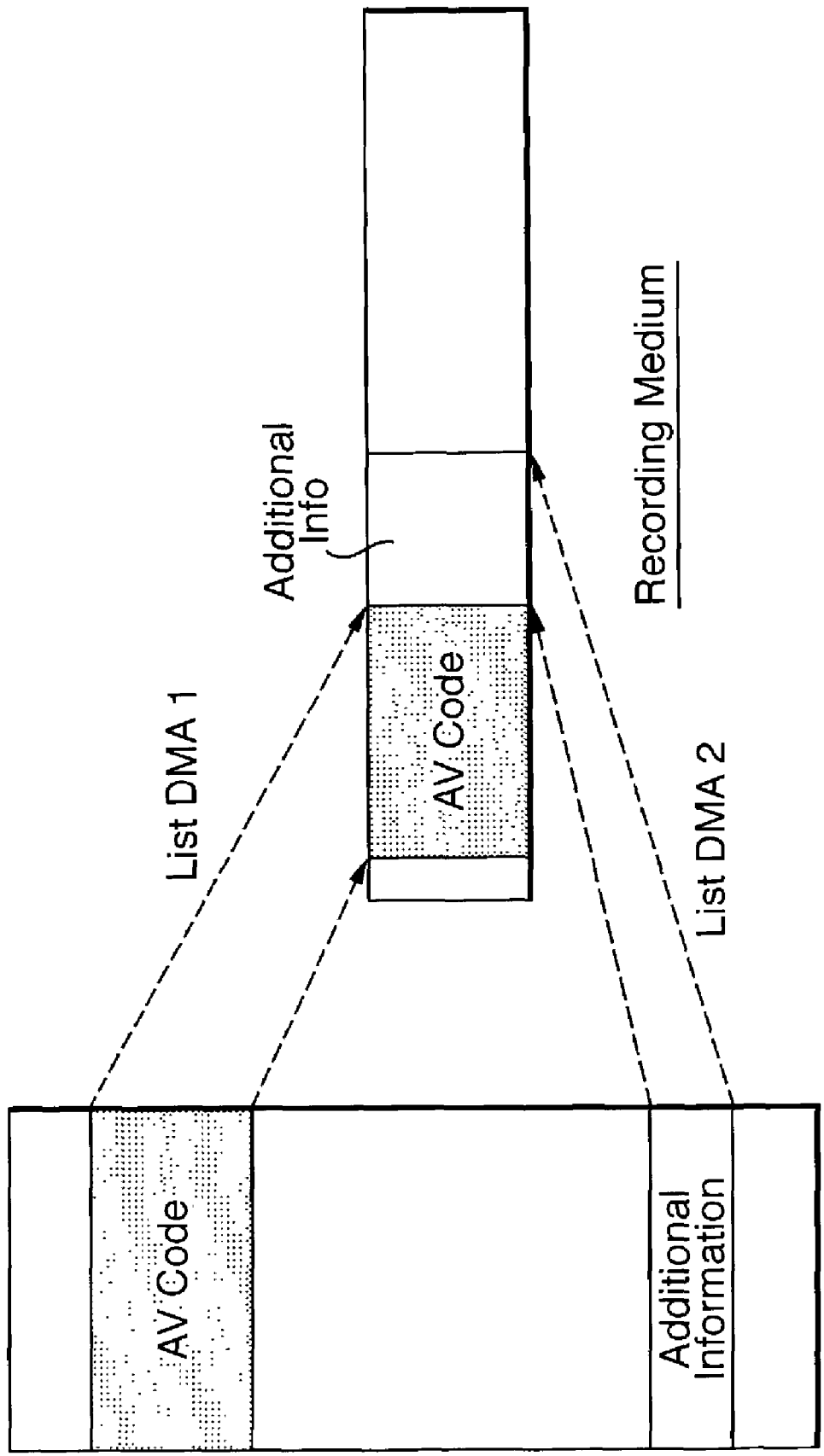
FIG. 5 illustrates schematically multiplexing of data according to the present invention.

In contrast, in the illustrated embodiment, data from the memories 4 and 8 is transferred via a chained list DMA. This is illustrated schematically in FIG. 5.

By way of explanation, a chained DMA list consists of a number of individual DMA requests. Each DMA request is executed one after the other in the order in which they are set. Each DMA request has an independent start and length with regard to the source memory. In other words, each DMA request has an individually set start address and independently set length of data for transfer.

The output memory 12 is instructed by the host 14 to write any received data starting at a particular address on the recording medium and is also instructed with a length which is the total length of all of the individual DMA requests. In this way, the chaining of the DMA request is invisible to the recording medium 12. The recording medium 12 sees this operation as a single DMA operation since the chaining of the list is hidden from the recording medium 12.

Figure 6:
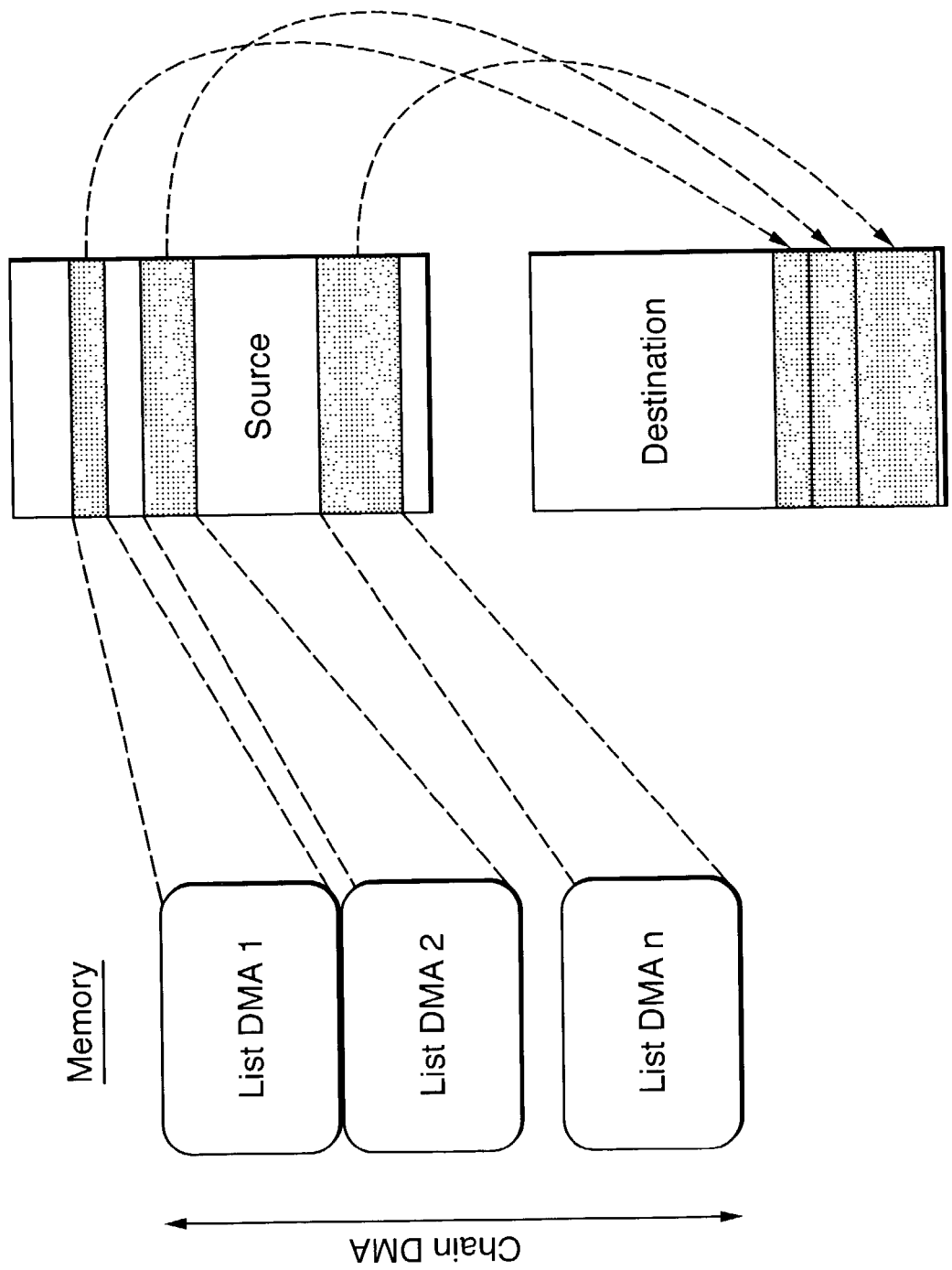
FIG. 6 illustrates schematically the list DMA process of the present invention.

FIG. 6 illustrates schematically the results of the list DMA transferring data from different sources, or different parts of a source, to a destination, such as the recording medium of output memory 12.

In order for the apparatus to operate on a continuous basis, i.e. recording audio/video data of the input data stream on to the recording medium of the output memory 12, the preferred embodiment includes an interrupt or trigger 16.

When memory 4 contains a predetermined amount of data, the interrupt or trigger 16 causes the host 14 to initiate the DMA process.

At that time, the host 14 instructs the DMA 10 with the start addresses and data lengths for the data in the memory 4 and memory 8 and also instructs the output memory 12 with the total amount of data to be recorded. The DMA 10 then conducts the chained DMA process so as to transfer the audio/video data from memory 4 and the supplementary data from memory 8. When the memory 4 again contains the predetermined amount of data, the interrupt or trigger 16 interrupts the host 14 so as to initiate the process once more.

In most cases, it is expected that the memory 4 containing the audio/video data will fill long before the memory 8. However, it is also possible to provide an additional interrupt or trigger connected to the memory 8 such that, if this memory reaches a predetermined amount of data, the host 14 is triggered to initiate the DMA process.

Figure 4:
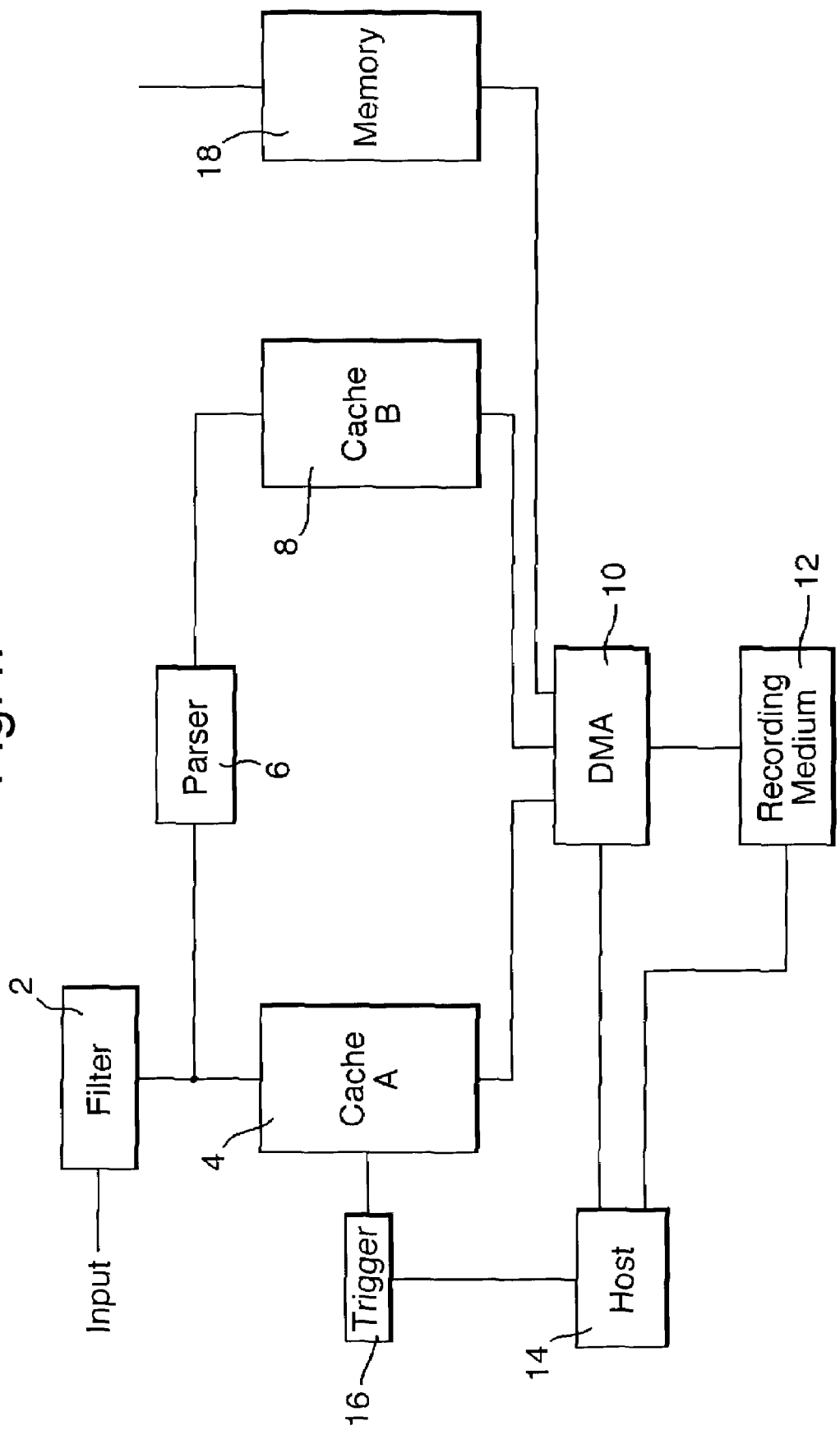
FIG. 4 illustrates an alternative embodiment of the present invention.

FIG. 4 illustrates an alternative embodiment including, additionally, a memory 18. In practice, of course, the memories 4, 8 and 18 may be separate areas of the same physical source memory, such as a single chip, and, hence, the embodiments of FIGS. 3 and 4 could operate in the same apparatus.

The memory 18 is intended for storing additional data, such as application data.

Some audio/video programs are provided with related applications, for instance games, for the user to operate in conjunction with the audio/video program. Hence, it is desirable that, when the audio/video data is recorded on the recording medium, the application data is also recorded. In the same way as discussed above, the application data could be stored separately on the recording medium of the output memory 12. However, when reproducing the data from the recording medium, this may result in large delays as the apparatus seeks data for the stored application. Thus, it is proposed that the host 14 causes the DMA 10 to store at least portions of the application data in the memory 18 together with the audio/video data and supplementary data.

Where, as described above, the apparatus operates on a continuous basis using the trigger 16 to store consecutively amounts of audio/video data and supplementary data, the host 14 instructs the DMA 10 with regard to consecutive portions of the application data in the memory 18. In this way, the application data as a whole is divided into portions which are interlaced with the audio/video data and supplementary data on the recording medium 12.

The application data can come from any appropriate source. For example, it could be downloaded from the Internet or received from the input stream of data, for instance from a different channel.

Since the present invention allows the combination of two or more different memory locations on to one continuous data stream on a recording medium, it is particularly appropriate for use with a recording medium having large seek times, but fast continuous access times. Thus, it may be used with a recording medium such as a hard disk drive or even tape.

Figure 7A:
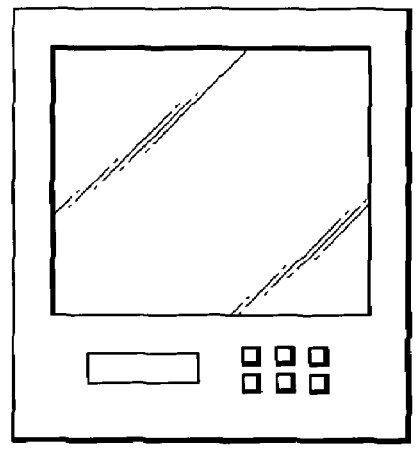
FIGS. 7(a) to (c) illustrate embodiments of the present invention.
Figure 7B:
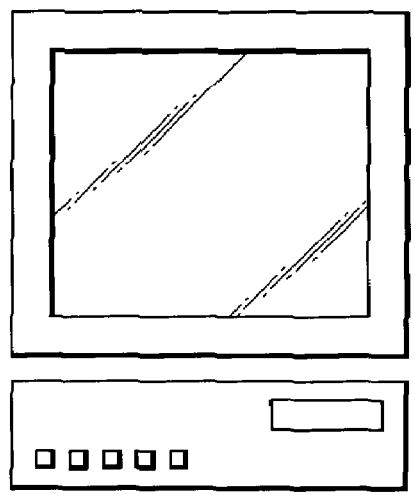
Figure 7C:
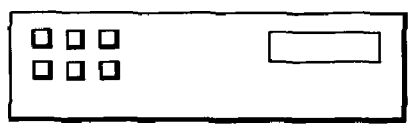

Such devices may be embodied in integrated televisions such as illustrated in FIG. 7(a), set top boxes as illustrated in FIG. 7(b) or stand alone audio/video recorders as illustrated in FIG. 7(c).

I claim:

1. An audio/video recording apparatus, comprising:
   a first input memory configured to store audio/video data included in a received input data stream;
   a parser configured to extract supplementary data from the input data stream, wherein the supplementary data comprises metadata for the audio/video data;
   a second input memory configured to store the supplementary data extracted from the input data stream and output by the parser;
   an output memory;
   a DMA processor connected between the first and second input memories and the output memory; and
   a controller configured to initiate a DMA process by instructing the output memory to receive a data amount equal to a sum of the audio/video data and the supplementary data and by providing the DMA processor with a link list so as to transfer the audio/video data from the first input memory and supplementary data from the second input memory to the output memory according to the link list.

2. An apparatus according to claim 1 wherein the supplementary data includes index data for the audio/video data.

3. An apparatus according to claim 2 further including an input for an MPEG stream containing said audio/video data and index data.

4. An apparatus according to claim 1 further including:
   an interrupt configured to cause the controller to initiate the DMA process when either of the first and second input memories contain a respective predetermined amount of data.

5. An apparatus according to claim 1, wherein the metadata is at least one of sub titles, supplementary information about the content of the audio/video data, supplementary audio data.

6. An apparatus according to claim 1 further including:
   a third input memory configured to store application data for applications related to the audio/video data,
   wherein the controller is configured to initiate the DMA process by instructing the output memory to receive a data amount equal to a sum of the audio/video data, the supplementary data and at least a portion of the application data and by providing the DMA processor with a link list so as to transfer the audio/video data, supplementary data and said at least a portion of the application data to the output memory according to the link list.

7. An apparatus according to claim 6 wherein, each time the controller initiates the DMA process, the controller instructs the output memory and provides a link list in respect of a different portion of the application data such that the application data is multiplexed with consecutive amounts of audio/video and supplementary data from the first and second memories.

8. An apparatus according to claim 1 wherein the output memory has large seek times, but fast continuous access times.

9. An apparatus according to claim 8 wherein the output memory is a hard disk drive.

10. An apparatus according to claim 1 embodied in one of an integrated television device, a set top box for a television and a stand alone video recorder.

11. A method of multiplexing audio/video data of a first input memory with supplementary data of a second input memory using a DMA processor, the method including:
   receiving an input data stream;
   storing audio/video data included in the received input data stream in a first memory;
   extracting supplementary data from the input data stream, wherein the supplementary data comprises metadata for the audio/video data;
   storing the supplementary data extracted from the input data stream in a second memory;
   providing the DMA processor with a link list for the audio/video data and the supplementary data stored in the first and second memories, respectively;
   providing an output memory with instructions to receive a data amount equal to the combination of audio/video data and supplementary data; and
   instructing the DMA processor to transfer the audio/video data from the first input memory and supplementary data from the second input memory to the output memory on the basis of the link list.

* * * * *